United States Patent

[11] 3,583,652

[72] Inventor Donald D. Merry
Westland, Mich.

[21] Appl. No 756,921
[22] Filed Sept. 3, 1968
[45] Patented June 8, 1971

[73] Assignee Rozinante, Inc.
Plymouth, Mich.

[54] TAPE CARTRIGE
7 Claims, 9 Drawing Figs.

[52] U.S. Cl. 242/55.19, 220/60
[51] Int. Cl. B65h 17/48
[50] Field of Search 242/55.19 A, 55.19; 352/128, 78; 179/100.2; 206/52 F; 220/60

[56] References Cited

UNITED STATES PATENTS

| | | | |
|---|---|---|---|
| 2,744,650 | 5/1956 | Woessner | 220/60 |
| 3,075,627 | 1/1963 | Kuckhoff | 220/60UX |
| 3,126,163 | 3/1964 | Knox | 242/55.19(A) |
| 3,252,670 | 5/1966 | Smith II | 242/55.19(A) |
| 3,420,461 | 1/1969 | Cousino | 242/55.19(A) |
| 3,438,591 | 4/1969 | Becker et al | 242/55.19(A) |

FOREIGN PATENTS

| | | | |
|---|---|---|---|
| 1,484,935 | 5/1967 | France | 242/55.19(A) |

*Primary Examiner*—Billy S. Taylor
*Attorney*—Whittemore, Hulbert and Belknap

ABSTRACT: The tape cartridge is of the type utilized in automobile tape playback systems. The cartridge comprises a rotatable spool having a reel of magnetic tape in endless array. The spool is enclosed and rotatably mounted within a casing. The casing includes a base and a cover for the base. Lug means are provided on the base. Snap action fastening means are provided on the cover to engage the lug means. The snap action fastening means comprise a plurality of resilient blades arranged around the interior periphery of the cover and are spaced from the cover and extend generally parallel thereto. The blades resiliently engage the lug means to secure the cover to the base. Guide means are provided in the casing over which the loop portion of the tape passes for transportation past a reproducing head. The guide means result in positive guiding of the tape to assure accurate reproduction.

INVENTOR
DONALD D. MERRY

BY Whittemore, Hulbert & Belknap
ATTORNEYS

INVENTOR
DONALD D. MERRY

BY Whittemore, Hulbert & Belknap
ATTORNEYS

TAPE CARTRIGE

BACKGROUND OF THE INVENTION

Magnetic tape players have recently come into widespread use as entertainment devices in automobiles. Such players generally comprise a playback system including a reproducing head, an amplifier, power supply and speaker system. The magnetic tape is provided in a cartridge as a self-contained unit. A number of different cartridges may be stored in the automobile and used as desired. In order to use a cartridge, it is merely inserted into a slotlike device. The reel of tape which is arranged in an endless fashion within the cartridge will play continuously until the cartridge is removed.

There are several aims in the design of a tape cartridge. One aim is to produce the cartridge as inexpensively as possible because the market considerations require a low-priced cartridge in order to achieve mass sales volume. Another consideration is the mounting and guiding of the tape within the cartridge. The guide system and mounting system should be such as to accurately guide the tape past a reproducing head and to ensure that the tape does not become entangled within the cartridge. Finally, the cartridge casing, which is made in two pieces, a base and a cover, should be assemblable with a minimum effort and once assembled should be relatively difficult to take apart to prevent inadvertent opening of the cartridge casing or otherwise tampering with the tape within the cartridge.

The present invention provides a cartridge structure in which the above three design considerations have been optimized.

SUMMARY OF THE INVENTION

The tape cartridge contains a rotatable spool having a reel of magnetic tape in endless array. A casing encloses and rotatably mounts the spool. The casing comprises a base and a cover therefor. Lug means are provided on the base. Snap action fastening means are provided on the cover in resilient engagement with the lug means to secure the cover to the base. The snap action fastening means comprise a plurality of resilient blades which are spaced from the cover and arrayed around the interior periphery of the casing. The lug means includes lugs on the base which are positioned between the blades and the cover to hold the cover to the base. Guide means are provided in the casing over which the loop portion of the tape is passed for transportation and positive guidance past a reproducing head.

IN THE DRAWINGS

Figure 1:
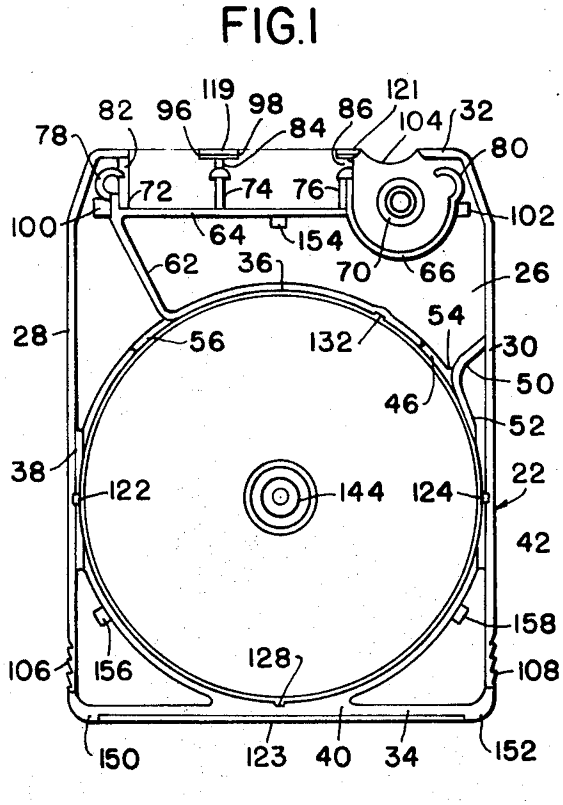
FIG. 1 is a plan view of the base of the cartridge casing forming one embodiment of the present invention.

The magnetic tape cartridge 10 comprises a casing 12 in which is mounted a spool 14 upon which is wound a reel of magnetic recording tape 16 which is arrayed in endless fashion. The tape 16 may be of the stereo or single-track-type and normally will have recorded thereon various musical compositions for replay through a speaker system. Such tape cartridges are commonly utilized in automobiles. The replay apparatus in the automobile may be mounted on the dashboard. A slot is provided to receive the cartridge 10. A magnetic pickup structure 18 and drive wheel 20 are provided, as illustrated in dotted lines in FIG. 3, within the replay structure. The replay structure includes an amplifier and power means (not shown) to drive the speaker system. The present invention is concerned with the cartridge per se and not with the replay system.

The cartridge casing 12 has a rectangular configuration with the sides being longer than the ends. The cartridge is relatively thin, just being big enough to accommodate the spool 14 without causing interference or sliding contact with the edges of the tape 16. The casing is preferably fabricated of a tough, low-cost plastic material and may be injection molded.

Figure 2:
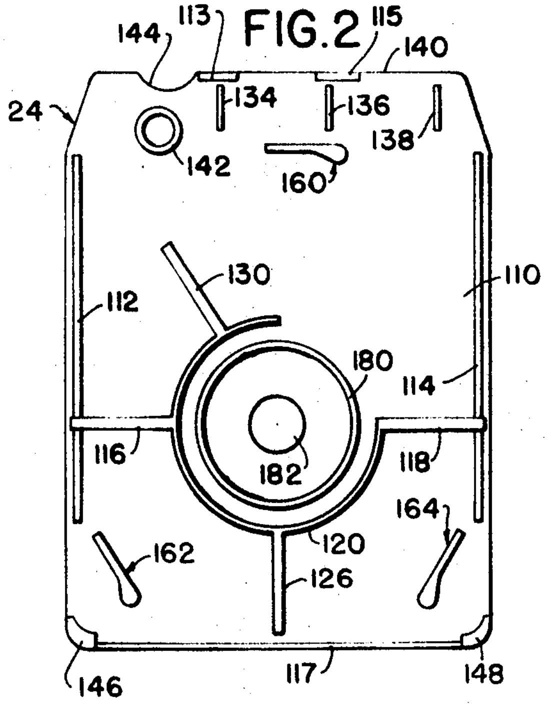
FIG. 2 is a plan view of the cover for the cartridge casing.

As will be noted in FIGS. 1 and 2, the casing 12 comprises two casing halves consisting of a base 22 and a cover 24. The base and cover are secured together by novel integral fastening means which form part of the present invention.

The base 22, which carries all the working parts of the cartridge, comprises a backwall 26 having upstanding sidewall structures 28, 30 and end wall structures 32, 34. A cylindrical wall structure 36 is provided within the base 22 substantially tangent to the sidewalls 28, 30 and end wall 34. As will be noted, the cylindrical wall 36 is joined to the side and end walls by means of webs 38, 40, 42 which strengthen the wall structure 36 as well as the side and end walls.

A hub 44 is provided on the backwall 26 at the center of the cylindrical wall 36. The hub 44 rotatably receives the spool 14. A U-shaped notch 46 is provided in the cylindrical wall 36 for passage of the returning tape section 48 of the loop portion. A V-shaped indentation 50 extends inwardly from the lower portion of the sidewall 30. One leg 52 forms a portion of the cylindrical wall structure 36. The apex 54 is curved to form a guide for the tape section 48.

A V-shaped notch 56 is provided in the cylindrical wall 36 for passage of the exiting section of tape 58. It will be noted, in FIG. 6, that one edge 60 of the notch 56 is at an angle of approximately 45° to the horizontal plane. The tape section 58 is drawn from the spool at the center thereof and is twisted at an angle as will be noted in FIG. 3. The angle of the edge 60 matches the twist in the tape to provide a guide surface therefor.

A wall 62 extends from the notch 56 towards the corner of the base 22. The wall 62 terminates short of the corner and merges with a wall 64 which extends parallel to the end wall 32. The wall 64 terminates short of the opposite sidewall 30 and merges with an arcuate wall section 66 which serves as a housing for a freely rotatable friction guide wheel 68 over which the tape passes as will be noted in FIG. 3. A hub 70 is provided for reception of the wheel 68. Three spaced-apart walls 72, 74, 76 extend perpendicularly from the wall 64 into the end wall 32. Notches 82, 84, 86 are provided therein for the passage of the forward playing section 88 of the tape. Opposed curved guide portions are provided on the edges of the notches 84, 86 for smooth passage of the tape. A relatively larger diameter cylindrical guide portion 78 is provided on the wall 72 as a positive guide surface for the tape to turn the tape section 58 and direct it parallel to the end wall 32. A similar curved guide portion 80 is provided on the arcuate wall section 66 at the opposite side of the casing for the return of the tape back to the spool.

Figure 3:
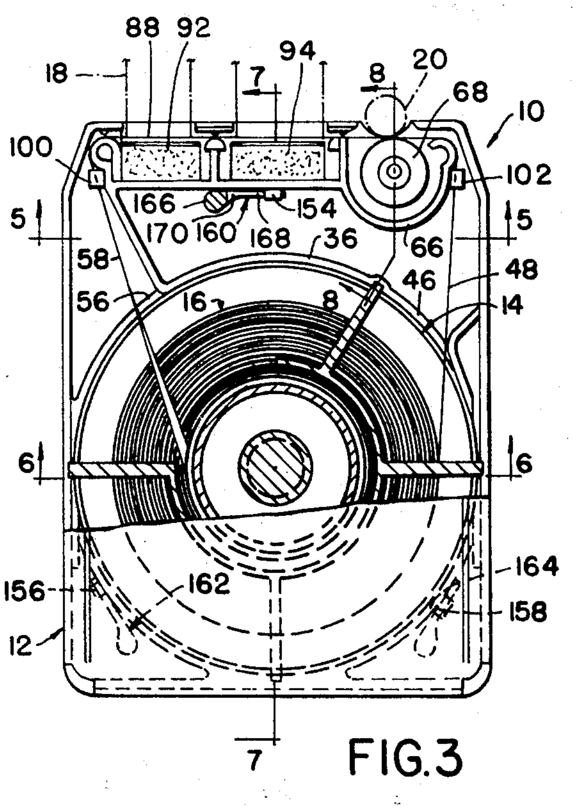
FIG. 3 is a view of an assembled cartridge with portions of the cover broken away for the purpose of clarity.
Figure 4:
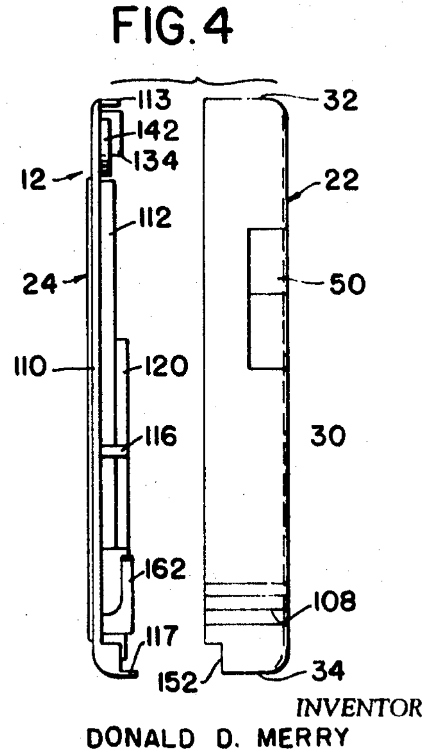
FIG. 4 is a side elevational view of the cover and base of the cartridge casing in disassembled relationship.

As will be noted in FIG. 3, sponge rubber guide elements 92, 94 are provided in the recesses defined by walls 72, 74, 76. A slippery plastic surfacing is provided on the forward faces of the guides 92, 94 for the smooth passage of tape. The guides 92, 94 serve to absorb any shock incident upon insertion of the magnetic pickup structure 18. A pair of openings 96, 98 are provided in the end wall 32 for insertion of the pickup structure 18.

A guide lug 100, 102 is provided on each side of the base 22. One lug 100 extends from the wall 62 while the other lug 102 extends from the wall 66. The lugs 100, 102 are spaced from the backwall 26. The exiting section of tape 58 passes beneath lug 100 and the returning section of tape 48 passes beneath the lug 102. The lugs 100, 102 thus function to positively guide the tape at the correct distance from the backwall 26 to the end that the tape will pass accurately by the pickup structure 18.

It will be noted that a circular notch 104 is provided in the end wall 32 for insertion of the drive wheel 20, the drive wheel 20 forming part of the playback structure (not shown). Additionally, it should be noted that serrations 106, 108 are provided on the sidewalls 28, 30 adjacent to the end wall 34. The serrations 106, 108 function to provide hand grips for handling of the cartridge.

The cover 24 comprises a backwall 110 from which extend sidewalls 112, 114. The sidewalls 112, 114 are spaced inwardly from the side edges of the backwall 110 and are received within the sidewalls 28, 30 of the base in pressure contact therewith. It will be noted that the sidewalls 112, 114 terminate well before either end of the backwall 110 so that they will fit within the base. Front tabs 113, 115 and rear wall 117 are provided for reception in slots 119, 121 and 123 of the base 22.

A pair of lateral wall sections 116, 118 extend inwardly from the sidewalls 112, 114 intermediate the ends thereof. The walls 116, 118 merge with a central cylindrical wall portion 120 provided centrally of the backwall 110. It will be noted that the walls 116, 118 extend out further from the backwall 110 than do the sidewalls 112, 114 and extend beyond the walls 112, 114 towards the edges of the backwall 110. The outer portions of the walls 116, 118 are received in notches 122, 124 provided in the webs 38, 40 of the base and form part of the means for locking the cover to the base. A third wall 126 extends from the cylindrical wall 120 towards the back edge of the back wall 110. The wall 126 is received in a notch 128 provided in the web 40 of the base. A fourth wall 130 extends from the cylindrical wall 120 angularly towards a corner of the backwall 110. The wall 130 is received in a notch 132 provided in the cylindrical wall 36 of the base. It will be appreciated that the four walls 116, 118, 126, 130 provide a spokelike four-point peripheral locking arrangement of the cover 24 to the base 22 thus preventing any twisting or other movement of these two elements with respect to each other.

Three spaced-apart wall elements 134, 136, 138 are provided adjacent the forward edge 140 of the backwall 110. The walls 134, 136, 138 are in alignment with the walls 72, 74, 76 of the base and serve to define stop surfaces to prevent the tape from working out of the notches 82, 84, 86. A cylindrical hub element 142 is provided to cooperate with the hub 70 in the base to hold the guide wheel 68 in place. A circular notch 144 is provided in the backwall 110 for alignment with the notch 104 in the base to define the recess for the drive wheel 20.

A projection 146, 148 is provided at each of the rear two corners of the backwall 110. The projections 146, 148 are received in notches 150, 152 provided in similar corners of the base 22. This structure provides additional locking means for the base and cover.

The base and cover are securely snap-fastened together by means of novel structure which is formed integrally therewith. Referring to FIG. 1, it will be noted that three lugs 154, 156, 158 are provided in a peripherally spaced fashion within the base. One lug 154 projects from the wall 64 substantially in the center of the base. The other two lugs 156, 158 are provided on the cylindrical wall portion 36 in spaced apart relation adjacent to the end wall 34. It will be noted in FIG. 7 that the lugs have a triangular configuration.

Figures 5, 6, 7, 8, 9:
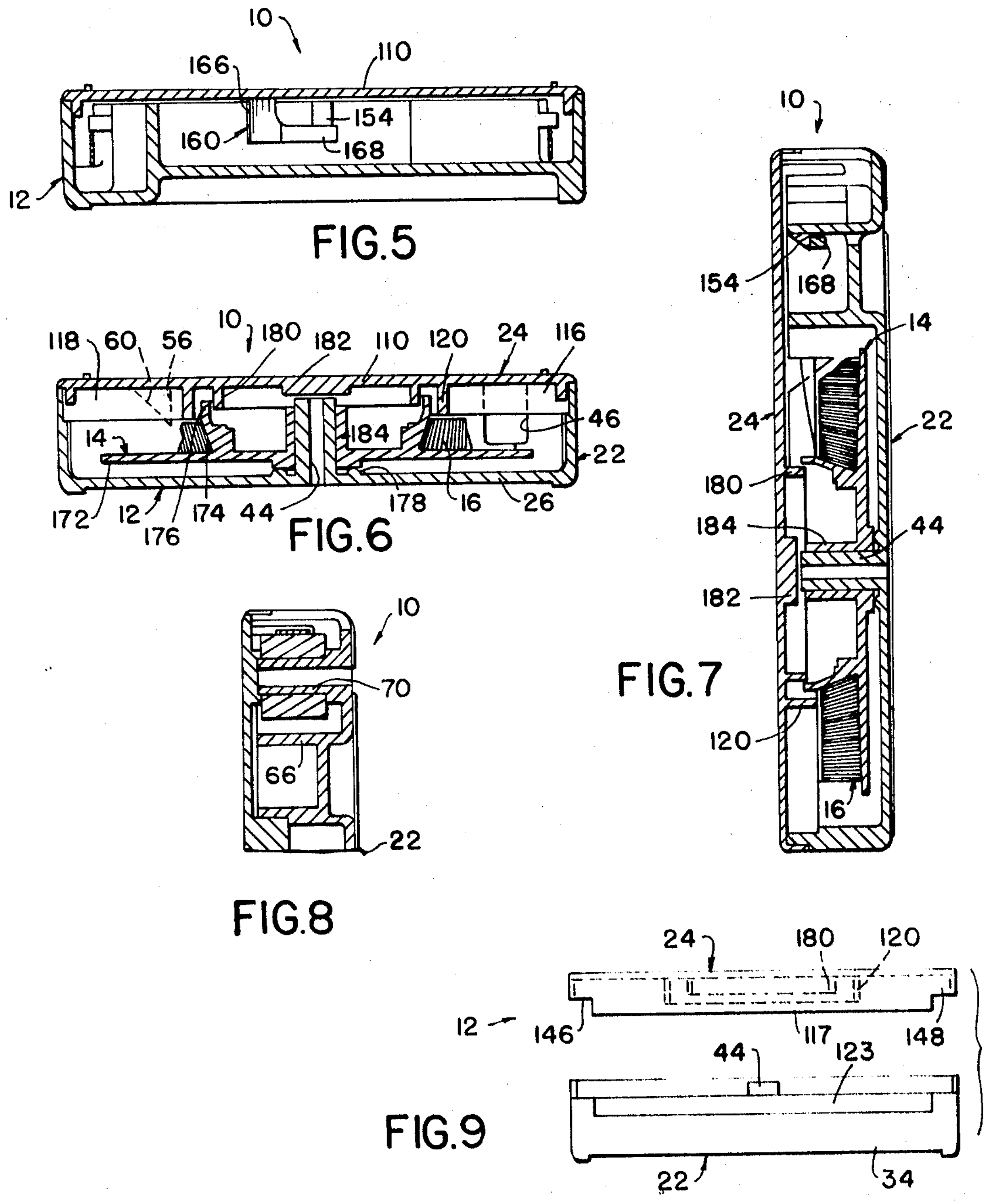
FIG. 5 is a sectional view of the cartridge taken substantially along the line 5–5 of FIG. 3 looking in the direction of the arrows.
FIG. 6 is a sectional view of the cartridge taken substantially along the line 6–6 of FIG. 3 looking in the direction of the arrows.
FIG. 7 is a sectional view of the cartridge taken substantially along the line 7–7 of FIG. 3 looking in the direction of the arrows.
FIG. 8 is a sectional view of the cartridge taken substantially along the line 8–8 of FIG. 3 looking in the direction of the arrows.
FIG. 9 is a front elevational view of the cartridge base and cover in disassembled relationship.

Referring to FIGS. 2, 3 and 5 it may be seen that three snap-fastening elements 160, 162, 164 are provided on the backwall 110 of the cover in substantial alignment with the lugs 154, 156, 158. Each of the snap-fastening elements has substantially the same construction. As best shown in FIG. 5, a relatively fixed post section 166 extends perpendicularly from the backwall 110. An elongated relatively thin blade section 168 extends outwardly from the end of the post 166 at substantially right angles thereto. The blade 168 is spaced from the backwall 110 whereby the snap-fastening element 160 has an L-shaped configuration. The post 166 has, in section as shown in FIG. 3, what may be termed a teardrop shape with the blade 168 extending from a point off center and tangentially to one side of the post. This arrangement results in a cantilever attachment of the blade 168 to the post with a thickened portion 170 merging into the blade to thereby permit flexing of the blade in a clockwise direction as viewed in FIG. 3 without breaking the blade from the post. As a result of the construction, the blade bends more or less uniformly along the thickened portion 170 and the adjacent teardrop portion of the post 166 as opposed to flexing at a particular specific point as would be the case if the blade extended radially from a circular post. As a consequence, the blade 168 may be flexed a considerable amount for engagement with the lug 154 without breaking.

In assembling the cover 24 to the base 22, the cover is positioned with the front edge thereof disposed a short distance from the end wall 32 of the base. The cover 22 is then slid towards the end wall 32 whereby the four walls 116, 118, 126, 130 will engage their respective notches and the end projection 146, 148 will engage the notches 150, 152 with the blades of the snap-fastening elements 160, 162, 164 being ultimately snapped beneath the lugs 154, 156, 158 to result in secure attachment of the cover 24 to the base 22. The space between the blades of the fastening elements 160, 162, 164 and the cover back wall 110 is substantially equal to or less than the thickness of the lugs 154, 156, 158 to thereby provide an interference fit which results in tight, secure engagement of the blades with the lugs. The blades may flex outwardly away from the wall 110 to some extent and the triangular configuration of the lugs permits some flexing of the lugs to thereby permit passage of the lugs beneath the blades.

The structure for retaining the spool 14 in place will now be described. As will be noted in FIG. 6, the spool 14 comprises a bottom circular disc 172 from which extends a cylindrical spool structure comprising a first conical portion 174 and a second circular portion 176. The tape 16 is stored on the conical portion 174, with the circular portion 176 serving as a guide for the exiting tape. As previously mentioned, the spool 14 is rotatably received on the hub 44. A circular bearing surface 178 is provided on the backwall 26 to journal the spool.

The cylindrical wall portion 120 extends downwardly from the backwall 110 of the cover and surrounds the circular portion 176 of the spool but does not touch this portion. The cylindrical wall 120 along with the walls 116, 118, 126, 130 which extend therefrom prevent the tape from riding up off the spool. A small diameter cylindrical wall 180 is provided within the cylindrical wall 120 and extends into the hollow spool 14. The cylindrical wall 180 serves to block the tape from entering the central portion of the spool should it become disengaged from the upper portion of the spool before it is directed away from the spool and guided by the pickup structure. A cylindrical member 182 is provided centrally on the backwall 110 in alignment with the central hub 184 of the spool. The cylindrical portion 182 limits the distance which the spool may ride up the hub 44.

I claim:

1. In a tape cartridge containing a rotatable spool having a reel of magnetic tape in endless array, a casing enclosing and mounting the spool, said casing comprising a base and a cover therefor, guide means in the casing over which the loop portion of the tape is positively guided for transportation past a reproducing head snap action fastening means on the cover, said snap action fastening means comprising a plurality of resilient elongated blades spaced from the cover, said blades being spaced from each other around a central portion of the cover, a post extending from the cover to support each blade, each post having a generally teardrop shape, the portion of the blade extending immediately therefrom at the juncture thereof being enlarged thereby to provide for flexing of the blade along the length thereof, and a plurality of lugs on the base, one lug being provided between each blade and the cover, each lug being in pressure contact with an edge of its respective blade to frictionally engage the blade.

2. A cartridge as defined in claim 1, and further characterized in the provision of at least three resilient blades, one lug being provided for each of the blades, one of said lugs being supported by a wall extending laterally across the base, each of the other of said lugs being supported by a wall extending at an angle to said laterally extending wall and diverging from each other, the respective blades being generally parallel to the lug supporting walls.

3. A cartridge as defined in claim 1, and further characterized in the provision of a spokelike wall structure extending from the cover, and notch means provided in the base receiving said spokelike wall means to lock the cover and base against relative twisting or lateral movement.

4. A cartridge as defined in claim 1, and further characterized in that the guide means in the casing over which the loop portion of the tape is positively guided for transportation past a reproducing head comprises a plurality of guide slot structures each including upper and lower guide surfaces and side guide surfaces to position the tape properly with respect to the reproducing head.

5. A cartridge as defined in claim 1, and further characterized in the provision of a hub on the base rotatably receiving the spool, and an arcuate ringlike projection structure on the base serving as a bearing for the spool.

6. A cartridge as defined in claim 1, and further characterized in that said spool includes a hollow cylindrical projection extending beyond the reel of magnetic tape, a pair of hollow concentric cylindrical wall structures extending from the cover and receiving therebetween but not touching said hollow projection of the spool to act as a guide and stop structure for the spool and reel of tape.

7. A cartridge as defined in claim 6, and further characterized in the provision of a projection on the cover in alignment with the center of the spool to act as a stop member to limit axial movement of the spool on the hub of the base.